(12) United States Patent
Brisebois et al.

(10) Patent No.: US 9,998,273 B2
(45) Date of Patent: *Jun. 12, 2018

(54) DEVICES AND METHODS FOR ASYMMETRICAL MULTICARRIER TRANSMISSION AND RECEPTION

(71) Applicant: AT&T Mobility II LLC, Atlanta, GA (US)

(72) Inventors: Arthur Richard Brisebois, Cumming, GA (US); Yung Shirley Choi-Grogan, Issaquah, WA (US); Melvin D. Frerking, Eastman, GA (US); Thomas Keathley, Brookhaven, GA (US); William Gordon Mansfield, Sugar Hill, GA (US); Alain Ohana, Aventura, FL (US); David Grant Shively, Smyrna, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/857,429

(22) Filed: Sep. 17, 2015

(65) Prior Publication Data

US 2016/0043859 A1 Feb. 11, 2016

Related U.S. Application Data

(63) Continuation of application No. 13/421,734, filed on Mar. 15, 2012, now Pat. No. 9,167,595, which is a
(Continued)

(51) Int. Cl.
*H04L 5/16* (2006.01)
*H04W 72/12* (2009.01)

(52) U.S. Cl.
CPC .......... *H04L 5/16* (2013.01); *H04W 72/1263* (2013.01)

(58) Field of Classification Search
CPC . H04W 72/1263; H04W 72/00; H04W 72/12; H04W 72/1226; H04W 72/1278; H04L 12/1818; H04L 67/1038; H04L 5/16
See application file for complete search history.

(56) References Cited

U.S. PATENT DOCUMENTS 5,546,549 A * 8/1996 Barrett ................. G06F 13/122
370/433
5,809,395 A 9/1998 Hamilton-Piercy et al.
(Continued)

FOREIGN PATENT DOCUMENTS

WO 2009002269 12/2008

OTHER PUBLICATIONS

Office Action dated Jun. 6, 2014 for U.S. Appl. No. 13/688,486, 21 pages.
(Continued)

*Primary Examiner* — Warner Wong
(74) *Attorney, Agent, or Firm* — Amin, Turocy & Watson, LLP (57) ABSTRACT

A duplex frequency is supplemented by providing simplex frequencies and distributing a data load among them. A server initially communicates with a communications device using a duplex channel. A scheduler of the server determines when it is no longer optimal to use the single duplex channel, and distributes data among the duplex channel and the simplex channels. Before sending this data through multiple channels, the server first sends a schedule to the communications device to inform which bits of data are coming through which channels at which times. The scheduler compiles this schedule and sends it to the communications
(Continued)

device through the duplex channel. A descheduler within the communications device receives the schedule and alerts the communications device to start receiving data on other simplex channels. The descheduler then puts the bits of data in order as they stream in across the duplex and simplex channels.

20 Claims, 6 Drawing Sheets

Related U.S. Application Data continuation of application No. 12/334,353, filed on Dec. 12, 2008, now Pat. No. 8,150,467.

(56) References Cited

U.S. PATENT DOCUMENTS

| | | | |
|---|---|---|---|
| 5,952,922 A | 9/1999 | Shober | |
| 5,970,056 A * | 10/1999 | Brailean | H04L 5/16 370/296 |
| 6,175,550 B1 | 1/2001 | van Nee | |
| 6,356,540 B1 | 3/2002 | Kojiro | |
| 6,791,952 B2 | 9/2004 | Lin et al. | |
| 7,206,581 B2 | 4/2007 | Zhang et al. | |
| 7,359,311 B1 | 4/2008 | Paranjpe et al. | |
| 7,415,282 B2 * | 8/2008 | Tillet | H04W 76/04 455/452.1 |
| 7,636,327 B1 * | 12/2009 | Doran | H04L 5/14 370/260 |
| 7,912,070 B1 * | 3/2011 | Choksi | H04L 65/1089 370/277 |
| 8,149,743 B1 * | 4/2012 | Choksi | H04L 5/14 370/296 |
| 8,811,240 B2 * | 8/2014 | Chindapol | H04L 5/0007 370/281 |
| 8,879,602 B2 | 11/2014 | Brisebois | |
| 9,319,210 B2 * | 4/2016 | Choi | H04L 5/14 |
| 9,621,194 B2 | 4/2017 | Brisebois | |
| 9,655,004 B2 * | 5/2017 | Yu | H04W 28/08 |
| 2002/0193146 A1 | 12/2002 | Wallace et al. | |
| 2003/0161343 A1 * | 8/2003 | Ghosh | H04W 72/1226 370/465 |
| 2004/0198425 A1 * | 10/2004 | Mellone | H04M 1/6066 455/553.1 |
| 2004/0213144 A1 * | 10/2004 | Murakami | H04B 1/692 370/208 |
| 2005/0181752 A1 | 8/2005 | Sahota | |
| 2006/0025165 A1 * | 2/2006 | Tillet | H04W 76/04 455/517 |
| 2006/0056534 A1 | 3/2006 | Ionescu et al. | |
| 2006/0067263 A1 | 3/2006 | Li et al. | |
| 2006/0142021 A1 * | 6/2006 | Mueckenheim | H04W 36/22 455/453 |
| 2006/0146750 A1 | 7/2006 | Chen et al. | |
| 2006/0229093 A1 * | 10/2006 | Bhutiani | H04W 4/10 455/518 |
| 2006/0256761 A1 | 11/2006 | Meylan et al. | |
| 2007/0239885 A1 * | 10/2007 | Vadlakonda | H04L 12/1827 709/232 |
| 2008/0037502 A1 | 2/2008 | Yokoyama | |
| 2008/0117859 A1 | 5/2008 | Shahidi et al. | |
| 2008/0174470 A1 | 7/2008 | Lum et al. | |
| 2009/0036062 A1 * | 2/2009 | Tanaka | H04L 1/0003 455/69 |
| 2009/0180402 A1 * | 7/2009 | Lindoff | H04B 1/44 370/277 |
| 2009/0203326 A1 | 8/2009 | Vesma et al. | |
| 2009/0232233 A1 | 9/2009 | Chen et al. | |
| 2009/0296609 A1 * | 12/2009 | Choi | H04W 72/121 370/281 |
| 2010/0008332 A1 * | 1/2010 | Balachandran | H04L 5/0007 370/336 |
| 2010/0034123 A1 * | 2/2010 | Razdan | H04W 4/10 370/277 |
| 2011/0007664 A1 * | 1/2011 | Diab | H04L 12/40136 370/254 |
| 2012/0182952 A1 * | 7/2012 | Stanwood | H04B 7/2615 370/329 |
| 2013/0083835 A1 | 4/2013 | Gupta | |
| 2013/0336147 A1 | 12/2013 | Tong et al. | |
| 2015/0003398 A1 | 1/2015 | Agrawal et al. | |
| 2015/0009865 A1 * | 1/2015 | Sharma | H04L 5/16 370/277 |

OTHER PUBLICATIONS

Office Action dated Mar. 15, 2011 for U.S. Appl. No. 12/206,774, 14 pages.
Office Action dated Aug. 23, 2011 for U.S. Appl. No. 12/206,774, 15 pages.
Office Action dated Aug. 23, 2011 for U.S. Appl. No. 12/334,353, 23 pages.
International Search Report & Written Opinion for International Application No. PCT/US2010/042007 dated Jan. 26, 2011, 17 pages.
3GPP TS 25.308 V7.0.0; Jun. 18, 2009; 3rd Generation Partnership Project; Technical Specification Group Radio Access Network; High Speed Downlink Packet Access (HSDPA); Overall description; Stage 2 (Release 7) 52 pgs.
3GPP TS 25.308 V8.6.0; Jun. 18, 2009; 3rd Generation Partnership Project; Technical Specification Group Radio Access Network; High Speed Downlink Packet Access (HSDPA); Overall description; Stage 2 (Release 8) 63 pgs.
3GPP TS 25.308 V9.0.0; Jun. 18, 2009; 3rd Generation Partnership Project; Technical Specification Group Radio Access Network; High Speed Downlink Packet Access (HSDPA); Overall description; Stage 2 (Release 9) 65 pgs.
3GPP TS 25.308 V7.8.0 (Sep. 2008);Technical Specification; 3rd Generation Partnership Project;Technical Specification Group Radio Access Network; High Speed Downlink Packet Access (HSDPA); Overall description; Stage 2 (Release 7); 51 pgs.
3GPP TS 25.308 V8.3.0 (Sep. 2008);Technical Specification; 3rd Generation Partnership Project;Technical Specification Group Radio Access Network; High Speed Downlink Packet Access (HSDPA); Overall description; Stage 2 (Release 8) 56 pgs.
3GPP TS 36.300 V8.6.0 (Sep. 2008);Technical Specification;3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 137 pgs.
Office Action dated Sep. 11, 2013 for U.S. Appl. No. 12/508,711, 28 pages.
Office Action dated Oct. 15, 2012 for U.S. Appl. No. 12/508,711, 28 pages.
Office Action dated Feb. 24, 2014 for U.S. Appl. No. 12/508,711, 31 pages.
Office Action dated Mar. 14, 2013 for U.S. Appl. No. 12/508,711, 25 pages.
Office Action dated Apr. 3, 2012 for U.S. Appl. No. 12/508,711, 24 pages.
Office Action dated Jun. 4, 2012 for U.S. Appl. No. 13/422,608, 20 pages.
Notice of Allowance dated Oct. 8, 2014 for U.S. Appl. No. 13/688,486, 20 pages.
Office Action dated Mar. 3, 2015 for U.S. Appl. No. 13/421,734, 9 pages.
Office Action dated Feb. 26, 2015 for U.S. Appl. No. 14/502,442, 5 pages.
Office Action dated May 11, 2016 for U.S. Appl. No. 14/918,187, 25 pages.
Office Action dated Apr. 19, 2017 for U.S. Appl. No. 15/469,451, 17 pages.

(56) References Cited

OTHER PUBLICATIONS

Office Action dated May 16, 2017 for U.S. Appl. No. 15/469,451, 13 pages.

* cited by examiner

| Bit Number | Size | Channel |
|---|---|---|
| 0001 | 512 b | 850 MHz |
| 0002 | 512 b | 850 MHz |
| 0003 | 1024 b | 1900 MHz |
| 0004 | 2048 b | 700 MHz |
| 0005 | 512 b | 850 MHz |
| 0006 | 1024 b | 850 MHz |
| 0007 | 1024 b | 1900 MHz |
| 0008 | 2048 b | 1900 MHz |
| 0009 | 512 b | 850 MHz |
| 000A | 1024 b | 700 MHz |
| 000B | 1024 b | 1900 MHz |
| 000C | 2048 b | 1900 MHz |
| 000D | 256 b | 850 MHz |
| 000E | 256 b | 850 MHz |
| 000F | 1024 b | 1900 MHz |
| 0010 | 2048 b | 700 MHz |
| 0011 | 256 b | 850 MHz |

DEVICES AND METHODS FOR ASYMMETRICAL MULTICARRIER TRANSMISSION AND RECEPTION

CROSS-REFERENCE TO RELATED APPLICATIONS

This application is a continuation of, and claims priority to each of, U.S. patent application Ser. No. 13/421,734 filed Mar. 15, 2012 and entitled "DEVICES AND METHODS FOR ASYMMETRICAL MULTICARRIER TRANSMISSION AND RECEPTION," which is a continuation of Ser. No. 12/334,353 (now U.S. Pat. No. 8,150,467), filed Dec. 12, 2008, and entitled "DEVICES AND METHODS FOR ASYMMETRICAL MULTICARRIER TRANSMISSION AND RECEPTION." The entireties of these applications are hereby incorporated herein by reference.

BACKGROUND

Field

The subject application relates to data transmission, e.g., asymmetrical data transmission over simplex and duplex channels.

Background

Cellular telephones are tremendously popular. It is estimated that at the end of 2007 the total worldwide subscriber rate reached 3.3 billion. Close to 80% of the world's population enjoys mobile telephone coverage, a figure that will only increase. As cellular telephones gain popularity, their functionality has increased also. Standard service includes voice calling, caller ID, call waiting, and voice mail. Service providers also offer text messaging, push mail, navigation, and even a high-speed internet connection directly to the telephone through the use of protocols such as those included in High Speed Packet Access (HSPA).

HSPA is a collection of wireless protocols that improve upon the performance of existing Universal Mobile Telecommunications System (UMTS) protocols. High-Speed Downlink Packet Access (HSDPA), a standard within HSPA, increases data packet transfer performance by using improved modulation schemes. These improved schemes better utilize existing radio bandwidth provided by UMTS. HSDPA currently supports downlink speeds of 1.8, 3.6, 7.2, and 14.4 Mbit/s. Long Term Evolution (LTE) is a promising standard for the next generation (4G) of mobile broadband networking.

Multiple-input and multiple-output (MIMO) requires the use of multiple antennas at both the transmitter and receiver. The signals from the antennas are combined to minimize errors and optimize data speed, providing better range and performance. However, the use of multiple inputs and outputs requires a device to utilize the same radio spectrum frequency. The United States presently uses the GSM-850 and GSM-1900 radio spectrum frequencies for cellular transmissions. GSM-850 uses 824-849 MHz for uplink and 869-894 MHz for downlink, providing channel numbers 128-251. GSM-1900 uses 1850-1910 MHz to uplink and 1930-1990 MHz to downlink, providing channel numbers 512-818. The MIMO concept defined in Third Generation Partnership Project Revision 7 (3GPP R7) and Revision 8 (MIMO R8), incorporated by reference herein in their entirety into this disclosure, requires the use of the same radio spectrum frequency for both transmission paths. These frequencies and antennas are used in spatial multiplexing or transmission diversity mode according to radio conditions. This allows for multiple simultaneous data streams, thereby increasing the data transmission rate.

MIMO R8 also requires twice the amount of antennas at both the transmitter and the receiver locations, even though the transmission takes place across a single frequency band. This creates interference in the signal, which decreases the actual gain in bandwidth created by MIMO R8. The additional signal used in MIMO R8 is another two-way transmit path. Although MIMO R8 can have up to four transmit paths, the uplink bandwidth is still equivalent to the downlink bandwidth, because each additional transmit path adds a duplex channel.

Demanding data services for individual users can exceed the capabilities of a single frequency carrier and/or radio path for a variety of transmission technologies. In this case, the capacity of multiple bi-directional frequency carriers and/or radio paths are combined, or "bonded" for the single demanding user. Multiple pre-existing bi-directional transmission pairs are allocated to the demanding user and traffic is spread across them. The Federal Communications Commission (FCC) recently auctioned the 700 MHz frequency spectrum. AWS-700 uses 776-794 MHz for uplink and 746-764 MHz for downlink.

As is, these transmission techniques offer useful means to boost individual peak throughput within the capabilities of the available transmission technology. However, bi-directional frequency carriers and/or radio paths, and the equipment required to use them, are best utilized if the data load and equipment capabilities are symmetrical. Unfortunately this is often not the case. Traffic for most data, audio, and video applications is heavily weighted in the downlink, server to user, direction. Roughly eight times as much data is downloaded to as is uploaded from mobile devices. The number of duplex signals available may limit these downlink requests. Many frequency bands are not intended for and not licensed for transmission by an individual user. Currently there are many of these frequencies available for downlink only which are being underutilized. Subscriber equipment, especially wireless, is also limited in terms of available space, power (battery life for mobile devices) and cost. The need for subscriber equipment to simultaneously transmit on all bonded frequency carriers and/or radio paths is therefore an unnecessary burden from an equipment complexity, cost and power perspective.

What is needed is a system that utilizes a downlink only channel to supplement the bandwidth of a conventional duplex channel to distribute the data load.

SUMMARY

The present invention supplements a duplex frequency by providing one or more simplex frequencies and distributing a data load among them. Embodiments of the present invention include a server containing a scheduler in communication with a communications device. The server initially communicates with the communications device using a duplex channel, or anchor channel. The scheduler determines when it is no longer optimal to use the single duplex channel, and distributes data among the duplex channel and one or more simplex channels. Before sending this data through multiple channels, the server must first send a schedule to the communications device, so the communications device knows which bits of data are coming through which channels at which times. The scheduler compiles this schedule and sends it to the communications device through the duplex channel. A descheduler within the communications device receives the schedule and alerts the communications device to start receiving data on other simplex channels. The descheduler then puts the bits of data in order as they stream in across the duplex and simplex channel.

Furthermore, embodiments of the present invention are not limited to HSPA, LTE, or wireless communication at all. The methods described herein are useful for any bi-directional communications system where there is more traffic in one direction than the other. Embodiments of the present invention are not limited to improving downlink capacity, as a simplex channel could be used to improve uplink capacity. For even more capacity multiple simplex channels can be used alongside the duplex channel.

In one exemplary embodiment, the present invention is a communications device comprising a memory, a descheduler on the memory, and a transceiver which communicates on a plurality of channels. An anchor channel is used for duplex transmission and one or more simplex channels are used to supplement one direction of the anchor channel.

In another exemplary embodiment, the present invention is an asymmetrical multicarrier communications system comprising a server, a scheduler in communication with the server, and a communications device in communication with the server via a plurality of channels. An anchor channel is used for a duplex transmission and one or more simplex channels are used to supplement one direction of the anchor channel.

In yet another exemplary embodiment, the present invention is a method of supplementing a data transmission of a duplex communication comprising selecting one or more simplex channels, compiling a data schedule, sending the data schedule to a recipient through a duplex channel, and sending the data transmission through the duplex channel and a first simplex channel. The data schedule comprises an association of bits of data to channels in which each bit is sent.

DETAILED DESCRIPTION

The present invention supplements a duplex frequency by providing one or more simplex frequencies and distributing a data load among them. Embodiments of the present invention include a server containing a scheduler in communication with a communications device. The server initially communicates with the communications device using a duplex channel, or anchor channel. The scheduler determines when it is no longer optimal to use the single duplex channel, and distributes data among the duplex channel and one or more simplex channels. Device feedback of the received data, such as level, quality, load, and various parameter settings are used to balance the transmission across duplex and simplex radio channels. These factors may all contribute to the initial and adapted ratio of data traffic sent on the various channels. Before sending this data through multiple channels, the server must first send a schedule to the communications device, so the communications device knows which bits of data are coming through which channels at which times. The scheduler compiles this schedule and sends it to the communications device through the duplex channel. A descheduler within the communications device receives the schedule and alerts the communications device to start receiving data on other simplex channels. The descheduler then puts the bits of data in order as they stream in across the duplex and simplex channels.

Furthermore, embodiments of the present invention are not limited to HSPA, LTE, or wireless communication at all. The methods described herein are useful for any bi-directional communications system where there is more traffic in one direction than the other. Embodiments of the present invention are not limited to improving downlink capacity, as a simplex channel could be used to improve uplink capacity. For even more capacity multiple simplex channels can be used alongside the duplex channel.

"Channel," as used herein and throughout this disclosure, refers to a single data pipeline among a plurality. Examples of channels include, but are not limited to, a specific frequency, a single cable when many are present, a specific radio path, a block of frequencies, a single wideband carrier, etc.

"Duplex," as used herein and throughout this disclosure, refers to a channel capable of bidirectional communication. Most duplex channels are symmetrical, meaning they have equal bandwidth in each direction.

"Simplex," as used herein and throughout this disclosure, refers to a channel capable of unidirectional communication. Most simplex channels are set to one direction or the other, but some can switch back and forth.

"Communications device," as used herein and throughout this disclosure, refers to any device capable of sending and receiving electronic bits of data. Examples of a communications device include but are not limited to mobile and land-line telephones, computers, personal digital assistants (PDAs), two-way radios, walkie-talkies, satellite transceivers, etc.

Figure 1:
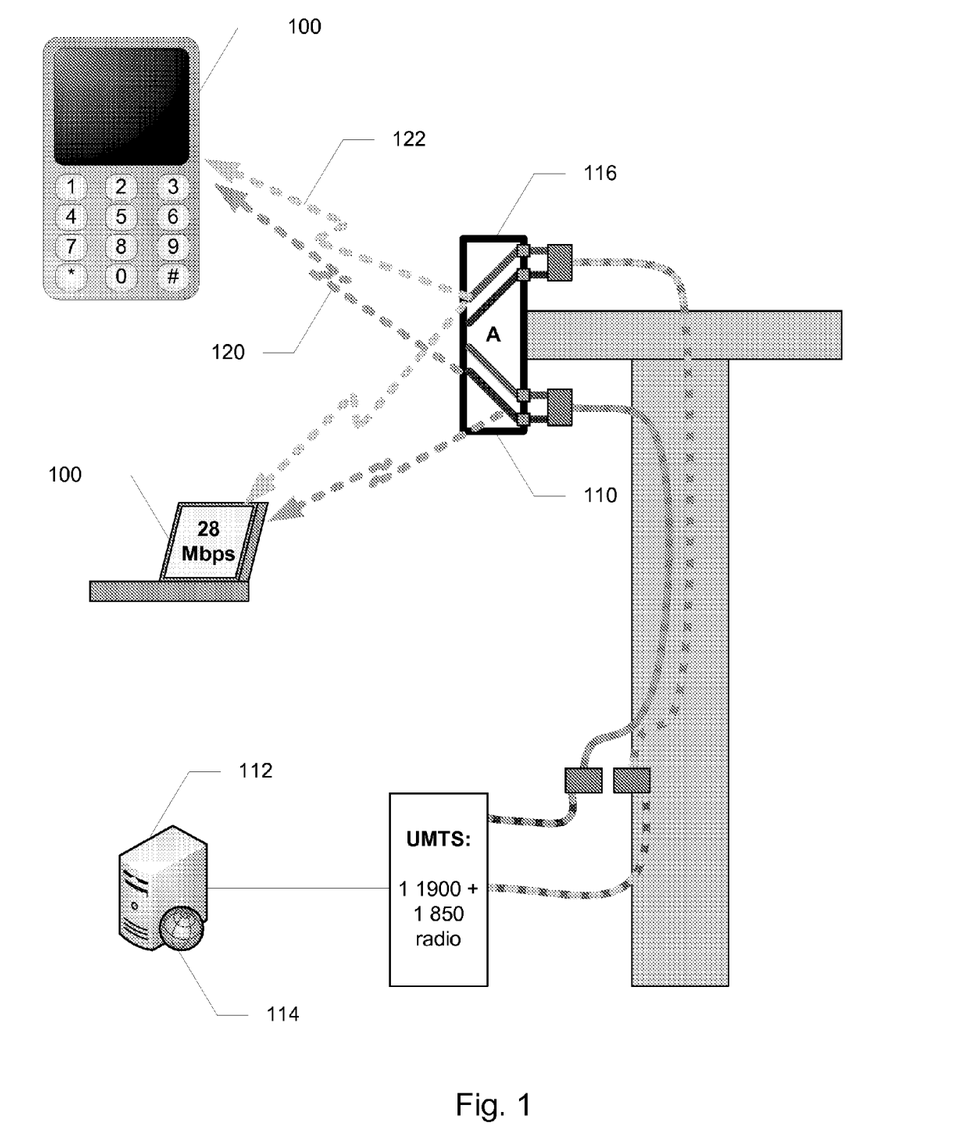
FIG. 1 shows a system utilizing asymmetrical data transmission and reception, according to an exemplary embodiment of the present invention.

FIG. 1 shows a system utilizing asymmetrical data transmission and reception, according to an exemplary embodiment of the present invention. In this embodiment, the system comprises a wireless communications device 100, a carrier antenna 110, a secondary antenna 116, a server 112, and a scheduler 114. Wireless communications device 100 is in communication with server 112 through carrier antenna 110 as well as secondary antenna 116. Carrier antenna 110 is used to transmit and receive information, in form of user plain data, across a duplex channel 120 between server 112 and communications device 110. Duplex channel 120, or anchor channel 120, allows for two-way communication using the same frequency. Secondary antenna 116 transmits information, in form of user plain data, across simplex channel 122 to wireless communications device 100 from server 112. Simplex channel 122 is used for downlink communication to communications device 100. When a user initiates a data session, the user sends a request to server 112 across duplex channel 120 through carrier antenna 110. Scheduler 114, in communication with server 112, sets the timing and frequency for which each of the requested data packets is sent. With the timing and frequency set, scheduler 114 builds a schedule. Server 112 transmits the schedule built to communications device 100 through duplex channel 120. Server 112 communicates the data to carrier antenna 110 as well as secondary antenna 116, based upon the schedule. Duplex channel 120 sends some of the data to communications device 100 as secondary antenna 116 sends other parts of the data over simplex channel 122, which utilize different frequencies.

According to this embodiment, a channel within the 1900 MHz frequency band is used for most communication since it is the duplex or anchor channel Another channel, within the 850 MHz frequency band, is used as a simplex channel. Since many cellular towers already use these frequencies the current hardware can be utilized to implement this embodiment. However, simplex channels that are licensed for downlink only can also be used to supplement the duplex channel since uplink is only required on one channel.

In further embodiments of the present invention, simplex channels may instead be used in the uplink direction. Users with high volumes of data that need to be uploaded use the simplex channels to send data to the server. This may require the use of different frequencies for uplink and downlink because there are some frequencies that are only licensed for one or the other.

In other exemplary embodiments, using for example, the system presented in FIG. 1, a method includes the selection and reselection of anchor carriers based upon signal strength and/or load. For example, certain anchor carriers are selected depending on particular loads presented in the system at the time of transmission of information. Selection of such anchor carriers is therefore dynamic and may be continually changed and monitored depending on system status and conditions. The method used for such selection/reselection is substantially similar to that shown in the figures.

Figure 2A:
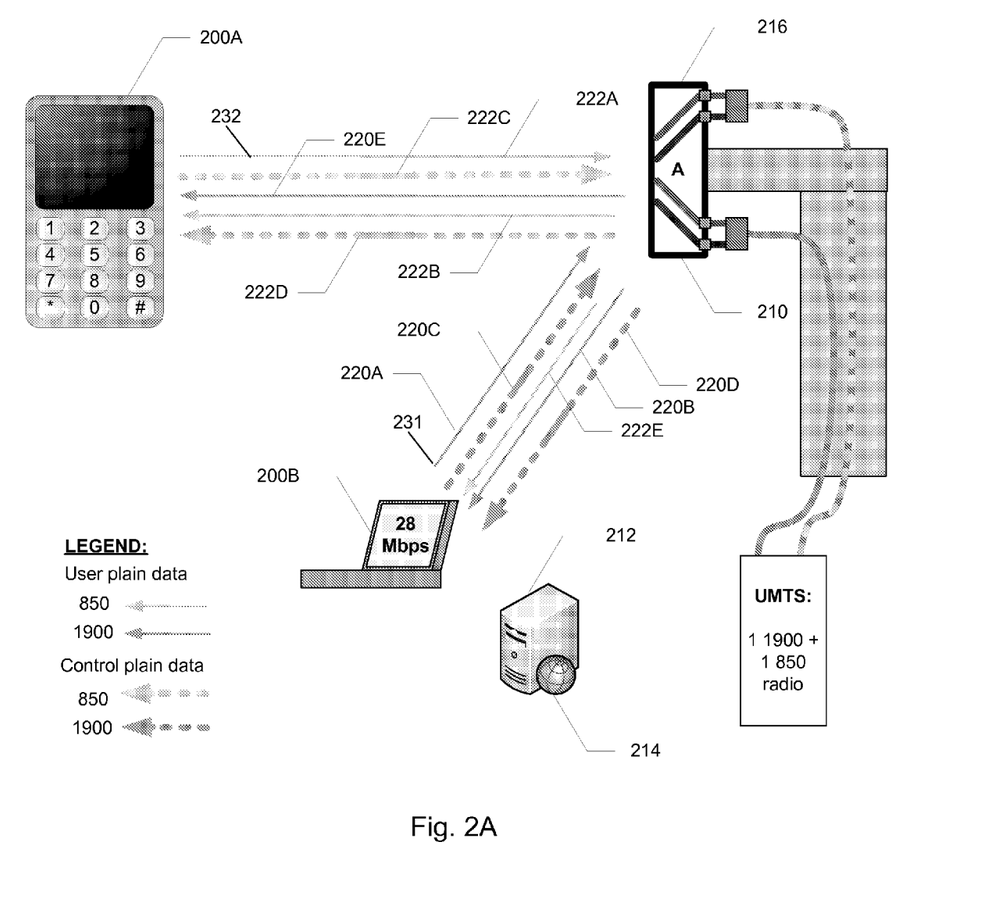
FIG. 2A shows individual data streams that allow asymmetrical communication according to an exemplary embodiment of the present invention.

FIG. 2A shows the individual data streams that allow asymmetrical communication between communications devices 200A and 200B and server 212 though primary/anchor (or duplex) channel 210 and secondary channel 216 according to an exemplary embodiment of the present invention. As shown in FIG. 2A and in more detail in FIG. 2B, at the near-field 231, communication with communications device 200B occurs using a channel 220 in the 1900 MHz frequency band as the duplex channel. Conversely, at a far-field 232, communication with communications device 200A occurs using channel 222 in the 850 MHz frequency band. For additional downlink speed in the near-field 231, a simplex channel 222E is used. Channel 220 breaks down into four parts. Channel 220A is a payload uplink where communications device 200B sends information to the server such as requests for content, outgoing email, etc. Channel 220B is a payload downlink where communications device 200B receives internet content, incoming email, etc. Channel 220B is the main gateway for receiving data on communications device 200B, and is the pipeline that needs broadening. Channel 222E is another downlink that effectively doubles the bandwidth in the downlink direction when combined with Channel 220B. However, in order to receive data on both channels 220B and 222E, a schedule must be transmitted by server 212 to communications device 200B. Channels 220C and 220D serve as bidirectional control plain uplink and downlink, respectively, solely for this schedule. The schedule is received by communications device 200B through channel 220D. Once the packets of data from the schedule have been received by communications device 200B, confirmation of the reception is sent through channel 220C.

Figure 2B:
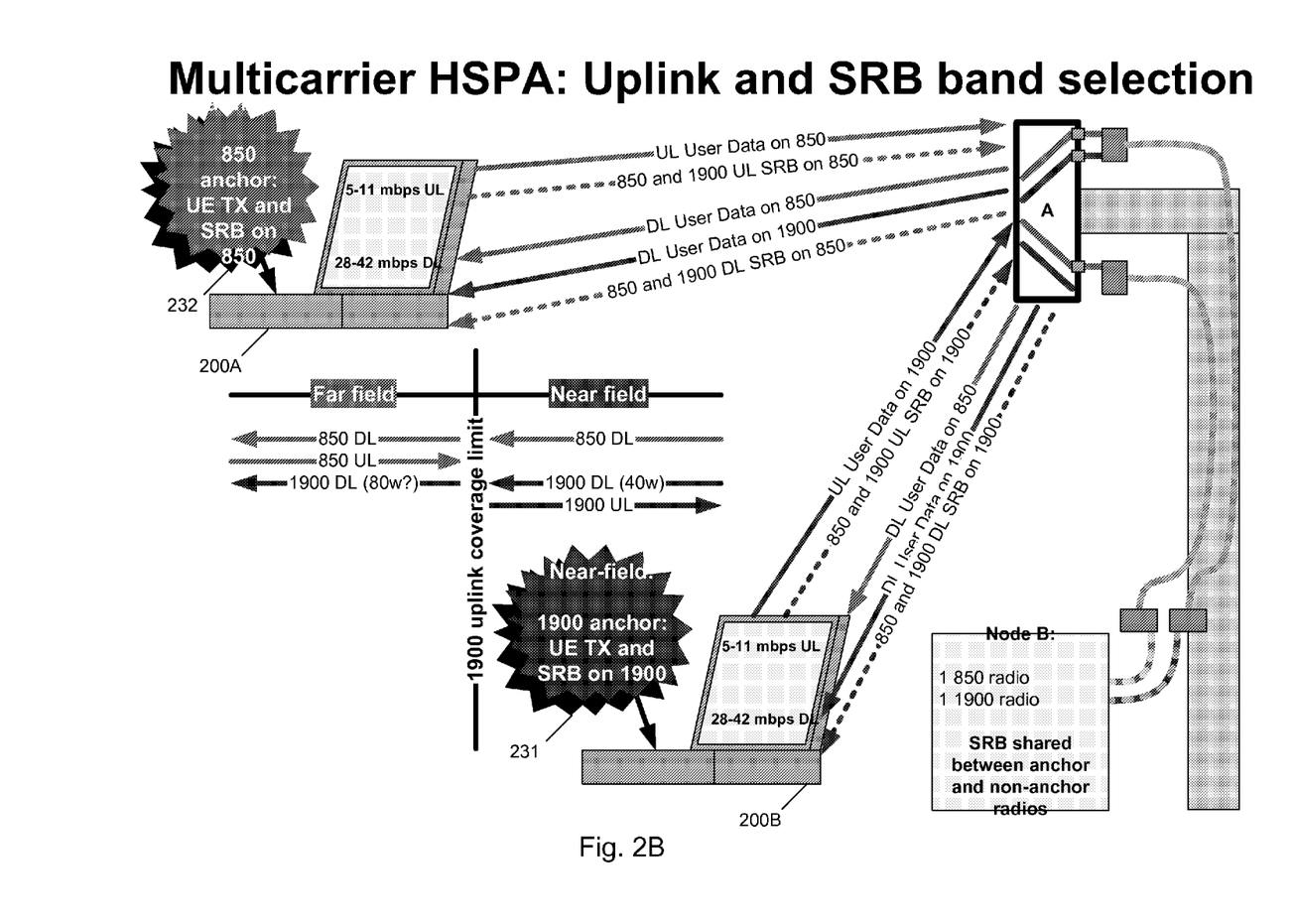
FIG. 2B shows individual data streams that allow asymmetrical communication based on position according to an exemplary embodiment of the present invention.

Due to a current limit in the power of the 1900 MHz antenna the same configuration may not be possible in the far field. Another exemplary embodiment uses a channel within the 850 MHz frequency band for the anchor channel, while a channel within the 1900 MHz frequency band is used for downlink only. Similar to the last example, channel 222 breaks down into four parts. Channel 222A is a payload uplink where communications device 200A sends information to the server such as requests for content, outgoing email, etc. Channel 222B is a payload downlink where communications device 200A receives internet content, incoming email, etc. Channel 222B is the main gateway for receiving data on communications device 200A, and is the pipeline that needs broadening. Channel 220E is another downlink that effectively doubles the bandwidth in the downlink direction when combined with Channel 222B. However, in order to receive data on both channels 222B and 220E, a schedule must be transmitted by server 212 to communications device 200A. Channels 222C and 222D serve as bidirectional control plain uplink and downlink, respectively, solely for this schedule. The schedule is received by communications device 200A through channel 222D. Once the packets of data from the schedule have been received by communications device 200A, confirmation of the reception is sent through channel 222C.

Figures 3A, 3B:
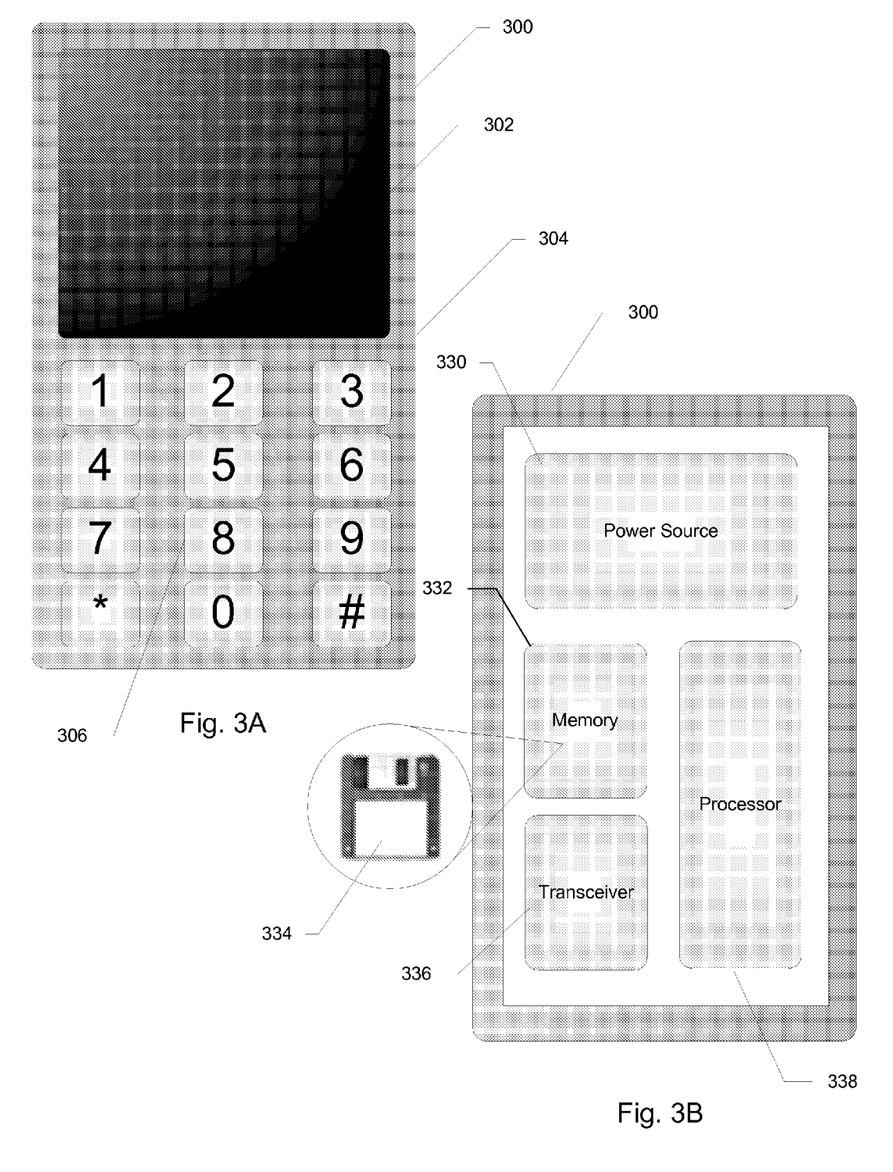
FIG. 3A shows a front view of a communications device for use with asymmetrical data transmission, according to an exemplary embodiment of the present invention.
FIG. 3B shows a view of components of a communications device, according to an exemplary embodiment of the present invention.

FIGS. 3A and 3B show a communications device for use with asymmetrical data transmission, according to an exemplary embodiment of the present invention.

FIG. 3A shows a front view of a communications device 300 for use with asymmetrical data transmission, according to an exemplary embodiment of the present invention. In this embodiment, the front of communications device 300 comprises a housing 304, a display 302, and a keypad 306. Housing 304 is preferably composed of a rigid and durable material, such as plastic or metal, to hold the components in place and prevent the components from being damaged. Display 302 is coupled to housing 304 and is used to view communications device 300's outputs. In exemplary embodiments of the present invention, display 302 is a liquid crystal display (LCD). Keypad 306 allows a user to input numbers, input letters, select functions, play games, etc.

FIG. 3B shows a view of components of communications device 300, according to an exemplary embodiment of the present invention. In this embodiment, the components comprise a memory unit 332, a processor 338, a transceiver module 336, a power source 330, and a descheduler 334 on memory unit 332. Memory unit 332 stores an operating system for communications device 300. Memory unit 332 additionally stores photos, music, games, telephone settings, telephone numbers, etc. Transceiver module 336 is utilized to communicate with wireless networks. This communication may use a cellular Radio Frequency (RF) connection, BLUETOOTH connection, WiFi connection, etc. Processor 338 runs the operating system of communications device 300 as well as other features and programs. Power source 330 provides power to each of the components of communications device 300. Many different channels are sending to communications device 300 over varying frequencies. Descheduler 334 pieces together the data from the multiple channels received by communications device 300. This is accomplished with the use of a schedule provided by a scheduler through an anchor channel.

Figure 4:
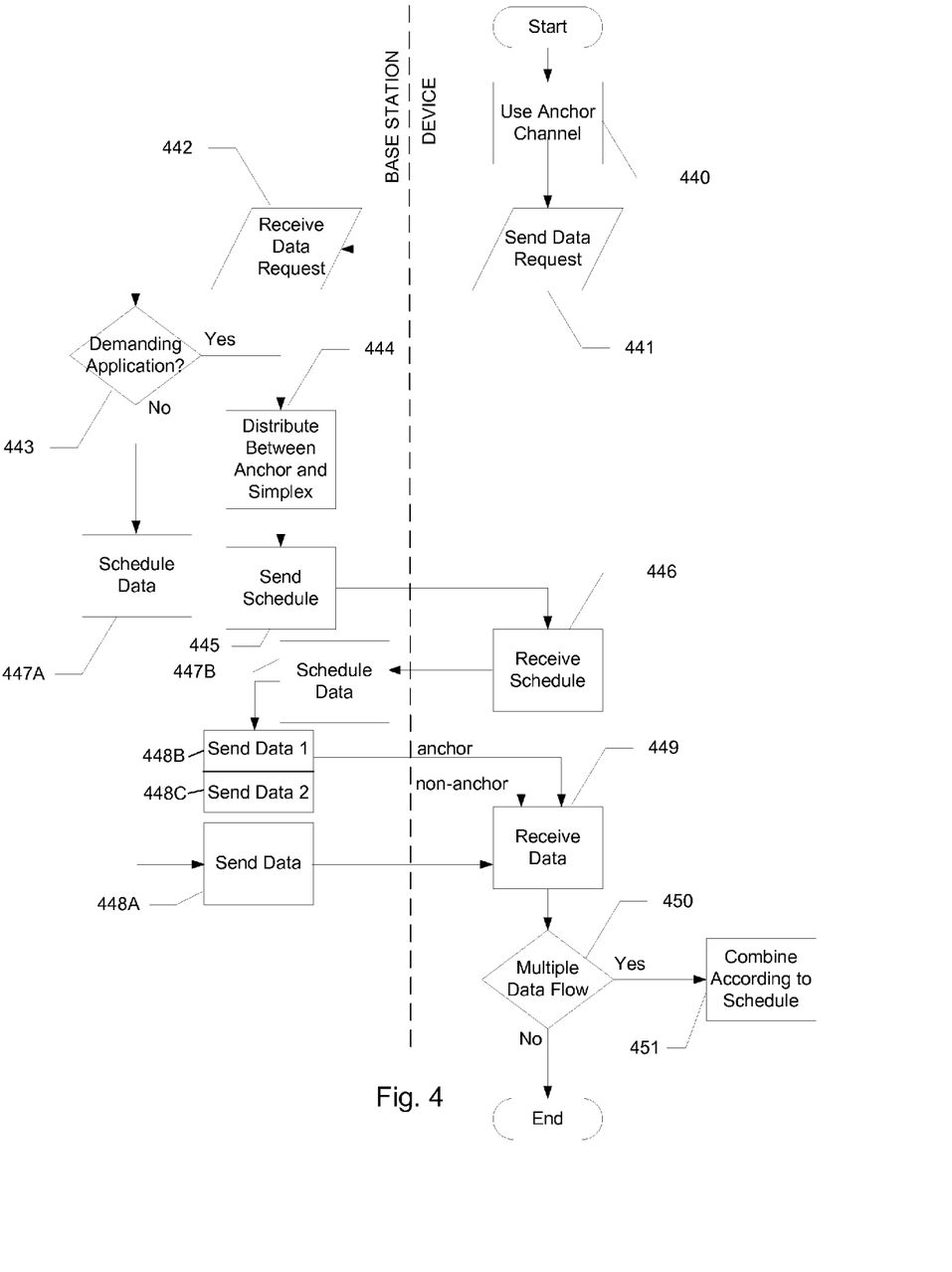
FIG. 4 shows a flowchart of a method of asymmetrical data transmission, according to an exemplary embodiment of the present invention.

FIG. 4 shows a flowchart of a method of asymmetrical transmission, according to an exemplary embodiment of the present invention. The dotted line in the figure divides the tasks performed by the base station/server from the tasks performed by the communications device. The tasks performed by the communications device are on the right of the dotted line while the tasks performed by the base station/server are on the left side of the dotted line. In this embodiment, a user device connects to an anchor channel 440, which is a duplex channel. Through this anchor channel, the communications device sends a data request 441 to download data. A server receives the data request 442 from the communications device. The server determines whether there is a demanding application 443 that requires additional data flow for the anchor channel. If the data would not cause an overload to the anchor channel, the data is scheduled 447 and subsequently sent 448A to the communications device. However, if the data would overload the frequency, asymmetrical transmission is used. The base station/server distributes the requested data between the anchor channel and one or more simplex channels 444. A scheduler onboard the server sends a schedule 445 to the communications device, describing the data packets being sent and which channel they will arrive on, the anchor channel or a simplex channel. The schedule is received 446 by the communications device. Once the schedule is received, the server schedules the data 447B according to that determined by the scheduler in step 445, and then sends the data via numerous paths 448B and 448C. Data that is carried on the anchor channel is sent to the device through path 448B and data carrier on non-anchor channel is sent to the device through path 448C. All data is received 449 by the communications device over the various channels. If the data has been received across multiple flow channels 450 then the communications device needs to combine the data packets in the order specified in the schedule 451. Otherwise, data that has been transported through a single channel is received without need for further combination with other data.

In other embodiments of the process shown in FIG. 4, distribution is used more frequently. Rather than only use data distribution when a channel is overloaded, the process uses data distribution when the result is more optimal than without distribution. If the data transmission can be received by the communications device faster, more efficiently and/or less costly using distribution than without, then the process uses distribution regardless of whether or not the channel is overloaded. If the distance between the communications device and the base station is far, then most likely 850 MHz channels are used, and if the distance is near, then either 850 MHz or 1900 MHz channels are used depending on signal strength and network load. Sometimes multiple simplex channels are used to further distribute the data. Further embodiments calculate which and how many simplex channels to use to transmit the data to the communications device the fastest.

Figure 5:
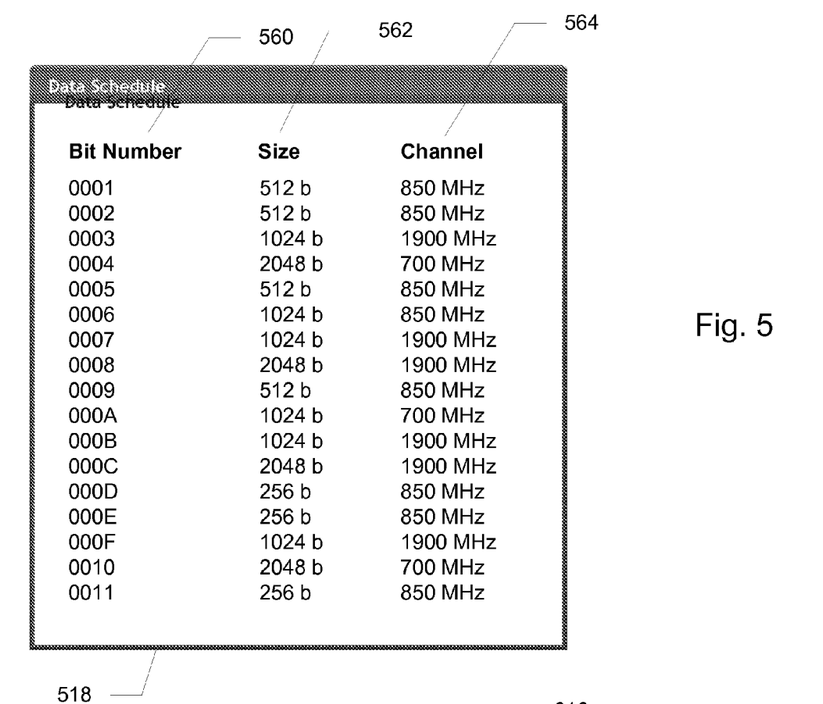
FIG. 5 shows a data schedule used by a scheduler onboard a server, according to an exemplary embodiment of the present invention.

FIG. 5 shows a data schedule 518 used by a scheduler in communication with a server, according to an exemplary embodiment of the present invention. In this embodiment, a bit number 560 is correlated with a size 562 and a channel 564. When a user requests a download, the scheduler divides up the requested data into bit numbers 560. Bit numbers 560 are then distributed among channels on which the server sends them. Schedule 518 shows which bit number 560 is sent on each channel 564, along with size 562 of each bit number 560. Schedule 518 is sent to the communications device, giving the communications device a roadmap to the data about to be sent. Once the schedule is received the communications device starts listening on other channels. According to this schedule, the communications device knows that the first 512 bits of data on the 850 MHz channel make up bit number 0001. Meanwhile, the first 1024 bits of data on the 1900 MHz channel make up bit number 0003. This continues across all channels until all the bits of data are collected. Once the communications device collects all the bits of data, a descheduler onboard the communications device pieces together the bits of data according to schedule 518.

Figure 6:
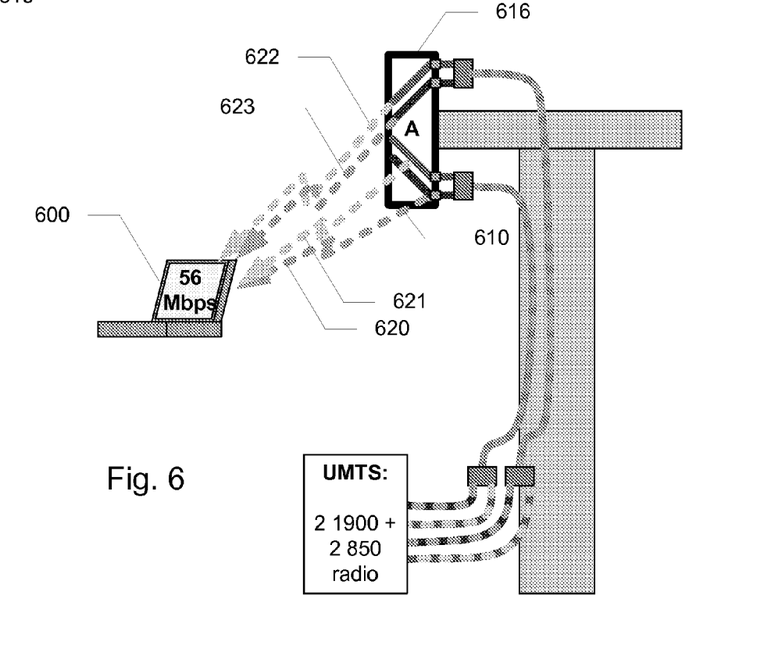
FIG. 6 shows a system utilizing asymmetrical data transmission and reception, utilizing multiple simplex channels, according to an exemplary embodiment of the present invention.

FIG. 6 shows a system utilizing asymmetrical data transmission and reception, utilizing multiple simplex channels, according to an exemplary embodiment of the present invention. Communications device 600 communicates using channel 620 as the anchor channel. When the demand from communications device 600 exceeds the bandwidth through channel 620, other channels are used along with channel 620. Channel 622 can be used to supplement the downlink of channel 620, but sometimes the demand from communications device 600 can exceed the combined bandwidth of channels 620 and 622. When this happens channel 621 and channel 623, which are also simplex, downlink only, channels, are used to further supplement the downlink of channels 620 and 622.

Even more downlink channels can be used alongside an anchor channel to supplement the downlink, or alternatively the uplink direction of a communications device.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
   receiving, at a first time by a system comprising a processor, information indicative of a distribution of data packets between a first anchor channel of anchor channels, the first anchor channel utilized for duplex transmission, and a simplex channel, utilized for simplex transmission, wherein the information is usable to organize the data packets for a communication between the system and a network server of a network;
   receiving, by the system, a first portion of the data packets via the first anchor channel and receiving a second portion of the data packets via the simplex channel, wherein the receiving the first portion and the second portion of the data packets is performed via asymmetrical multicarrier communication;

generating, by the system, feedback information regarding the first portion of the data packets and the second portion of the data packets, wherein the feedback information facilitates balancing of transmissions between the anchor channel and the simplex channel; and selecting a second anchor channel of the anchor channels, at a second time of transmission of the data packets, for receipt of a group of the data packets based on a load at the second time.

2. The method of claim 1, wherein the receiving the information comprises receiving the information prior to the receiving the first portion of the data packets.

3. The method of claim 2, wherein the receiving the information comprises receiving the information prior to the receiving the second portion of the data packets.

4. The method of claim 1, wherein the receiving the information comprises receiving timing information associated with times of receipt of the data packets.

5. The method of claim 1, wherein the receiving the information comprises receiving frequency information associated with a frequency of receipt of the data packets.

6. The method of claim 1, further comprising:
transmitting, by the system, a request for the data packets via the first anchor channel.

7. The method of claim 1, further comprising:
selecting, by the system, frequencies associated with the first anchor channel based on a distance between the system and an access point device.

8. A system, comprising:
a processor; and
a memory that stores executable instructions that, when executed by the processor, facilitate performance of operations, comprising:
receiving schedule information indicative of a distribution of data packets between an anchor channel, utilized for duplex transmission, and a simplex channel, utilized for simplex transmission;
receiving the data packets via asymmetrical multicarrier communication comprising receiving a first portion of the data packets via the anchor channel and receiving a second portion of the data packets via the simplex channel; and
transmitting, to a server device, feedback relating to the first portion of the data packets and the second portion of the data packets to facilitate balancing of transmissions across the anchor channel and the simplex channel, wherein the feedback is associated with a first quality of the first portion and a second quality of the second portion, wherein the schedule information is based on an estimated load of an application with which the data packets are associated, and wherein the receiving the data packets via the asymmetrical multicarrier communication is performed in response to a determination by the system that the estimated load of the application satisfies a defined condition.

9. The system of claim 8, wherein the receiving the schedule information comprises receiving the schedule information prior to the receiving the first portion of the data packets and the receiving the second portion of the data packets.

10. The system of claim 8, wherein the operations further comprise:
identifying a channel on which a portion of the data packets is to be received at a specified time.

11. The system of claim 8, wherein the receiving the schedule information comprises receiving timing information associated with a time of receipt of a data packet of the data packets.

12. The system of claim 8, wherein the receiving the schedule information comprises receiving frequency information associated with a frequency receipt of the data packets.

13. The system of claim 8, wherein the operations further comprise:
transmitting a request for the data packets via the anchor channel.

14. A non-transitory machine-readable storage medium, comprising executable instructions that, when executed by a processor, facilitate performance of operations, comprising:
receiving schedule information indicative of a distribution of data packets between an anchor channel, utilized for duplex transmission, and a simplex channel, utilized for simplex transmission;
receiving a first portion of the data packets via the anchor channel via asymmetrical multicarrier communication;
receiving a second portion of the data packets via the simplex channel via the asymmetrical multicarrier communication; and
arranging first bits of the first portion and second bits of the second portion according to the schedule information, and wherein the first portion and the second portion are balanced for transmission on the anchor channel or the simplex channel, respectively, based on a load of the data packets, wherein the schedule information is based on an estimated load of an application with which the data packets are associated, and wherein the receiving the first portion of the data packets via the asymmetrical multicarrier communication is performed in response to a determination that the estimated load of the application satisfies a defined condition.

15. The non-transitory machine-readable storage medium of claim 14, wherein the receiving the schedule information comprises receiving the schedule information prior to the receiving the first portion of the data packets and the receiving the second portion of the data packets.

16. The non-transitory machine-readable storage medium of claim 14, wherein the operations further comprise:
identifying a channel on which a portion of the data packets is to be received at a specified time.

17. The non-transitory machine-readable storage medium of claim 16, wherein the identifying is based on the schedule information.

18. The system of claim 10, wherein the identifying is based on the schedule information.

19. The system of claim 10, wherein the simplex channel is located at the 850 megahertz frequency band.

20. The system of claim 10, wherein the anchor channel is located at the 1900 megahertz frequency band.

* * * * *